July 29, 1924.

W. D. MERCER

VALVE MECHANISM

Filed April 11, 1923

1,502,736

INVENTOR
William D. Mercer
BY Smith & Freeman
ATTORNEYS.

Patented July 29, 1924.

1,502,736

UNITED STATES PATENT OFFICE.

WILLIAM D. MERCER, OF DETROIT, MICHIGAN, ASSIGNOR TO KELVINATOR CORPORATION, OF DETROIT, MICHIGAN, A CORPORATION OF DELAWARE.

VALVE MECHANISM.

Application filed April 11, 1923. Serial No. 631,483.

*To all whom it may concern:*

Be it known that I, WILLIAM D. MERCER, a citizen of the United States, residing at Detroit, in the county of Wayne and State of Michigan, have invented a certain new and useful Improvement in Valve Mechanism, of which the following is a full, clear, and exact description, reference being had to the accompanying drawings.

My invention relates to valve mechanism and particularly to valve mechanism for use in gas compressors. In these compressors it is desirable to provide means by which the discharge valve from the compressor chamber may open an abnormal amount to readily discharge any liquid such as oil which may accumulate in the compressor chamber and in this way relieve the compressor chamber and other parts from undue strain. In providing such means it has been customary in certain makes of compressors to mount the valve in a movable support arranged to remain stationary under normal operation but to yield under an abnormal pressure. While this construction has been found satisfactory in general various features seem to admit of improvement and my invention is particularly desirable to accomplish this improvement.

In the drawings accompanying this specification and forming a part thereof I have shown, for purpose of illustration, one form which my invention may assume. In these drawings:

Figure 3 is an enlarged detail showing the valve mechanism of Figure 1, while

Figure 1:
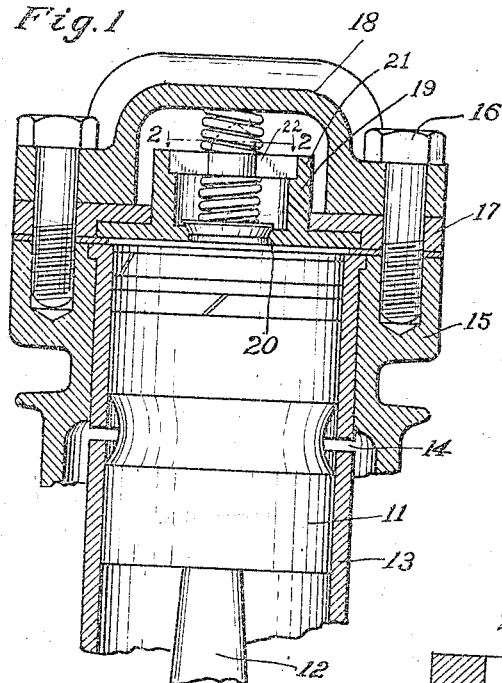
Figure 1 represents a section through a compressor showing this illustrative form of my invention.
Figure 2:
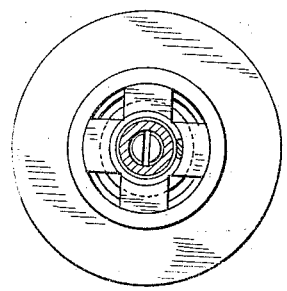
Figure 2 is a section on the line 2—2 of Figure 1.
Figure 3:
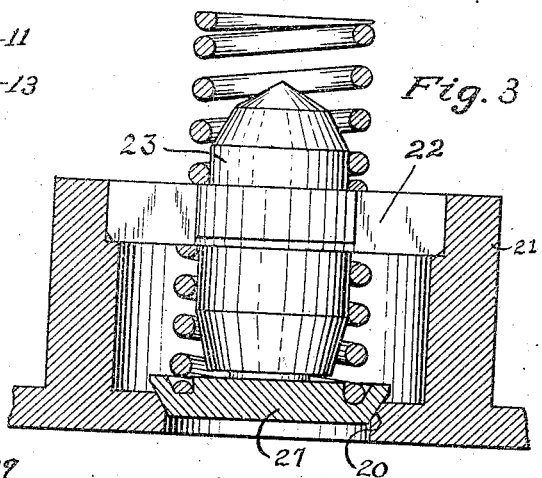
Figure 4:
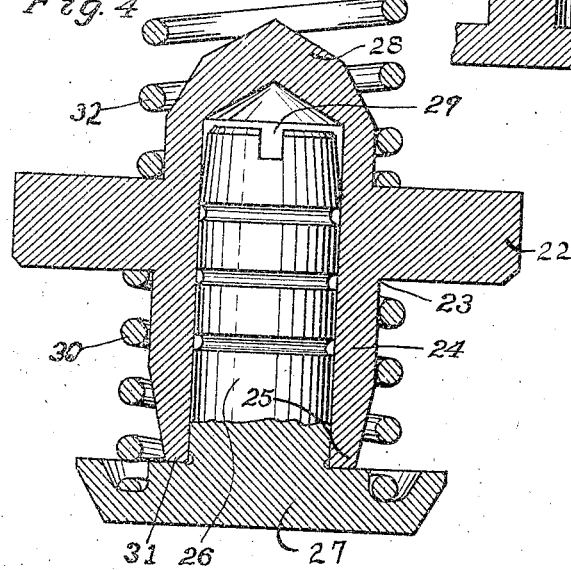
Figure 4 is a further enlarged detail showing portions of the mechanism shown in Figure 3.

In the drawings I have shown a piston 11 operated by means of a connecting rod 12 in a cylinder 13 provided with inlet ports 14 and surmounted by a cylinder head 15 to which is secured by means of bolts 16 an outlet duct comprising a plate 17 and a casing 18. Clamped between this plate 17 and the cylinder 11 is a valve housing 19 comprising a valve seat 20 and a tube 21 arranged to slidably support a spider 22 forming an integral part of a valve mounting 23 which comprises in addition to the spider 22 a cylindrical portion 24 open at its lower end 25 to receive the valve stem 26 of a valve 27 adapted to seat in the valve seat 20 of the plate 17 and closed at its upper end 28 to form with the valve stem 26 a chamber 29 adapted to act as a dash pot to cushion the movement of the valve 27 relative to the valve mounting 23. The valve 27 is biased to closed position by a relatively light spring 30 and limited in its opening movement by engagement of its upper face 31 with the lower end 25 of the tube 24 while the entire valve mounting 23 is biased to valve closing position by a relatively strong spring 32.

It will be apparent from the above description that the valve 27 is free to open a normal amount in response to any pressure sufficient to overcome the relatively light spring 30, that this movement is limited by the engagement of the upper face 31 of the valve 27 with the lower end 25 of the tube 24 of the valve mounting 23, that further opening movement of the 23, that further opening movement of valve 27 is possible by upward movement of the entire valve mounting 23 in response to pressure sufficient to overcome the action of the relatively strong spring 32, and that movement of the valve 27 relative to the valve mounting 23 is cushioned in both directions so that hammering of the upper face 31 of the valve 27 against the lower end of the tube 24 and of the valve 27 against the seat 20 is prevented.

Those skilled in the art will recognize that various modifications and construction may be made without departing from the essence of my invention and accordingly this disclosure is illustrative only and my invention is not limited thereto.

I claim:

1. Valve mechanism comprising a valve housing, a valve mounting movably supported therein, biased toward valve closing position, and provided centrally with a tubular guide, a valve, having its stem mounted in said guide and arranged to form with said guide a chamber cushioning the movement of said valve in at least one direction, biased to closed position, forming with said mounting means to limit the opening movement of said valve relative to said mounting, and having its stem provided with grooves adapted to collect and retain liquid to increasingly seal said cushioning chamber.

2. Valve mechanism comprising a valve housing, a valve mounting movably supported therein and biased to one position, and a valve supported in said mounting and biased to corresponding position, said mounting and said valve being so formed that movement of said valve relative to said mounting is limited and that a permanently closed chamber is formed between said mounting and said valve effective to retard movement of said valve in at least one direction.

3. Valve mechanism comprising a valve housing, a valve mounting movably supported therein, biased toward valve closing position, and provided centrally with a tubular guide, a valve having its stem mounted in said guide, arranged to form with said guide a chamber cushioning the movement of said valve in at least one direction, biased to closed position, and forming with said mounting means to limit the opening movement of said valve relative to said mounting.

4. In a gas compressor, the combination with a member ported to form an outlet from said compressor, of a valve seated upon said ported member and controlling said outlet, a spring, housed within said ported member, seating said valve, and designed to yield under a predetermined gaseous pressure, a movable abutment for said spring seated upon said ported member, telescoping stems upon said valve and said abutment member limiting the normal opening movement of the valve and forming a chamber adapted to cushion the movement of said valve relative to said abutment in at least one direction, and a relatively strong spring resisting movement of said abutment and yieldable under an abnormal pressure on said valve to permit an increased opening thereof.

In testimony whereof, I hereunto affix my signature.

WILLIAM D. MERCER.